United States Patent
Wehking et al.

[19]

[11] Patent Number: 5,951,432
[45] Date of Patent: Sep. 14, 1999

[54] PLANETARY GEAR TRANSMISSION

[75] Inventors: Jeffrey Bodley Wehking, Ann Arbor; Kumaraswamy V. Hebbale, Troy; Sekhar Raghavan, Troy; Patrick Benedict Usoro, Troy, all of Mich.

[73] Assignee: General Motors Corporation, Detroit, Mich.

[21] Appl. No.: 09/179,756

[22] Filed: Oct. 27, 1998

[51] Int. Cl.$^6$ ........................................ F16H 3/44
[52] U.S. Cl. ..................... 475/280; 475/281; 475/284; 74/764
[58] Field of Search ................... 475/280, 281, 475/282, 283, 284, 277; 74/764

[56] References Cited

U.S. PATENT DOCUMENTS 5,194,055  3/1993  Oshidari ...................... 475/28
5,879,264  3/1999  Raghavan et al. .................. 475/280

*Primary Examiner*—Charles A. Marmor
*Assistant Examiner*—Tisha D. Waddell
*Attorney, Agent, or Firm*—Michael J. Bridges

[57] ABSTRACT

A planetary gearing arrangement has a compound planetary gear set and a simple planetary gear set. The planetary gear sets are continuously interconnected at the sun gear members and are interconnectable through the selective engagement of two proportioning clutches which change the interaction of the gear sets. A single member, a ring gear, is continuously connected to an output shaft. The arrangement also includes two input clutches and two brakes which in combination with the proportioning clutches permit the establishment of five forward ratios and one reverse ratio. Two of the forward ratios are underdrives and two of the ratios are overdrives. All of the forward ratio interchanges, the neutral to forward ratio change and the neutral to reverse ratio change are of the single transition type.

3 Claims, 1 Drawing Sheet

PLANETARY GEAR TRANSMISSION

TECHNICAL FIELD

This invention relates to power transmissions, and more particularly, to power transmissions having multi-speed planetary gearing.

BACKGROUND OF THE INVENTION

Automatic transmissions employ multi-speed planetary gear sets, controlled by friction clutches and brakes, to provide a plurality of gear ratios between the engine and final drive gearing. The number of ratios provided in passenger vehicles has increased from two forward ratios and one reverse ratio to five forward ratios and one reverse ratio. As the number of ratios increases, the number of planetary gear sets has increased.

Currently, the five speed transmissions available in passenger vehicles incorporate three planetary gear sets. It has been proposed in the art to use only two gear sets. Such devices are disclosed in pending U.S. patent applications Ser. Nos. 09/037,332 filed Mar. 10, 1998, and Ser. No. 08/925,259 filed Sep. 8, 1997, which are assigned to the assignee of this application. Five speed arrangements incorporating two gear sets are also shown in U.S. Pat. Nos. 5,141,477 and 5,567,201.

SUMMARY OF THE INVENTION

It is an object of the present invention to provide an improved planetary gear transmission having five forward gear ratios and one reverse gear ratio while using two planetary gear sets and a minimum clutch and brake assemblies.

In one aspect of the present invention, a compound planetary gear set and a simple planetary gear set are interconnected by two proportioning clutches which change the gearing relations of the two planetary gear sets.

In another aspect of the present invention, two input clutches are provided to establish separate input members during four of the five forward ratios and the reverse ratio.

In yet another aspect of the present invention, a pair of friction brakes are provided to be engaged in cooperation with the four clutches during the establishment of four of the forward ratios and the reverse ratio.

In still another aspect of the present invention, one of the brake members may remain engaged during a forward direct drive ratio without effect on the transmission ratio, but will prepare the transmission to change ratios, up or down, with a single transition.

In a further aspect of the present invention, one of the input clutches and one of the proportioning clutches are engaged during a neutral condition to permit the establishment of either the low forward ratio or the reverse ratio with the engagement of respective brake members.

In yet a further aspect of the present invention, two overdrive ratios are provided, during one of which, both friction brakes are engaged to establish the compound planetary gear set as a reaction member for the sun gear member of the simple planetary gear set.

DESCRIPTION OF AN EXEMPLARY EMBODIMENT

Figure 1:
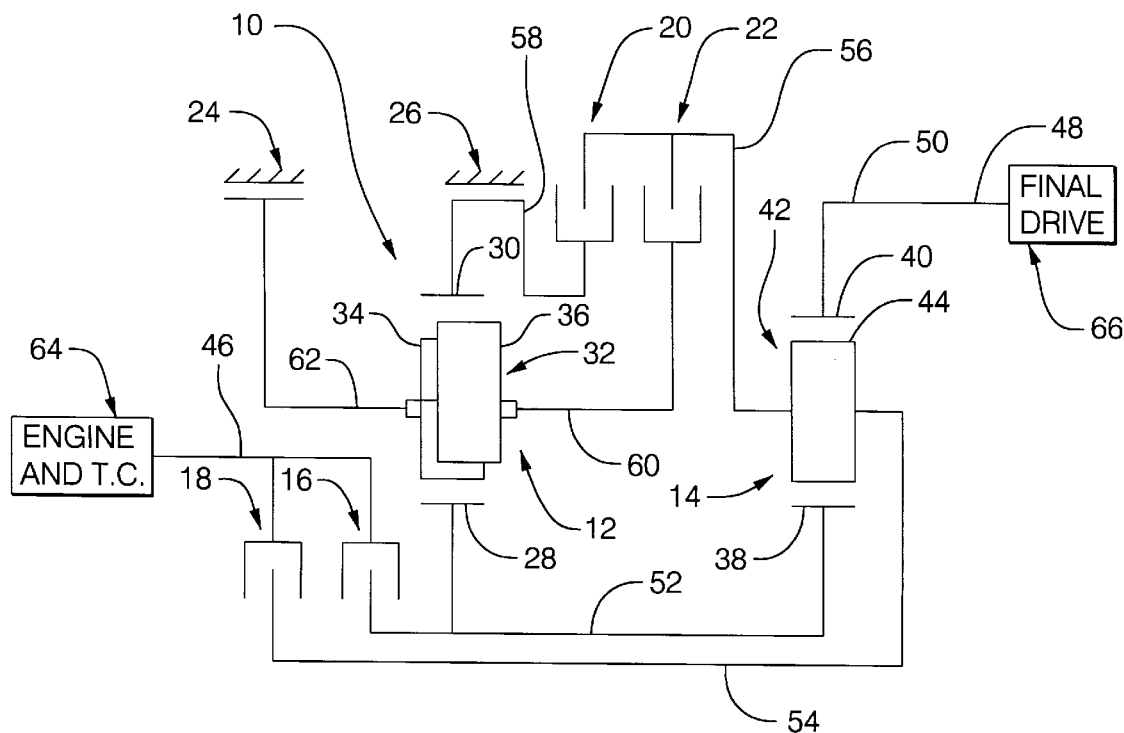
FIG. 1 is a schematic diagram of a planetary gearing arrangement incorporating the present invention.

A planetary gear arrangement 10 is represented schematically in FIG. 1. The arrangement 10 includes a compound planetary gear set 12, a simple planetary gear set 14, two input clutches 16, 18, two proportioning clutches 20, 22 and a pair of brakes 24, 26. The clutches 16, 18, 20 and 22 are preferably selectively engageable, fluid operated disc type devices. The design, function and operation of these clutches is well-known. The brakes 24, 26 are also preferably selectively engageable, fluid operated devices and may be either of the band type or disc type. Both of these types of brakes have been used in planetary type transmissions for many years. As with the clutches, the design, function, and operation of the brakes is well-known. Those skilled in the art of power transmission construction will recognize that other types of selectively engageable devices can also be employed with the planetary gear arrangement 10.

The compound planetary gear set 12 includes a sun gear member 28, a ring gear member 30 and a carrier gear assembly member 32. The carrier gear assembly member 32 has a plurality of pairs of intermeshing pinion gears 34, 36 which mesh with the sun gear member 28 and ring gear member 30, respectively. The simple planetary gear set 14 includes a sun gear member 38, a ring gear member 40 and a carrier gear assembly member 42. The carrier member has a plurality of pinion gears 44 which mesh with both the sun gear member 38 and the ring gear member 40.

The clutches 16 and 18 are connected with an input shaft 46 and the ring gear 40 is continuously connected with an output shaft 48 through a hub member 50. The sun gear members 28, 38 are interconnected by a shaft 52 which is also connected with the clutch 16. The carrier gear assembly member 42 is connected by a shaft 54 with the clutch 18.

The carrier gear assembly member 42 also includes a hub portion 56 which is connected with the proportioning clutches 20, 22, The clutch 20 is connected with the ring gear member 30 through a hub 58 and the clutch 22 is connected with the carrier gear assembly member 32 through a hub 60. The brake 24 is operatively connected with a hub 62 which is connectable with the carrier gear assembly member 32, and the brake 26 is operatively connectable with the hub 58 which is connected with the ring member 30.

An engine and torque converter 64 are connected with the clutches 16 and 18 to provide a power input for the transmission. The engine and torque converter are conventional devices well-known to those skilled in the transmission art. A final drive gearing arrangement 66 is disposed between the output shaft 48 and the vehicle drive wheels, not shown. These devices are also conventional and well-known assemblies. The torque converter provides a torque multiplier between the engine and the input shaft 46 during vehicle launch and also permits the vehicle to idle when the engine throttle is released by the operator. The final drive gearing arrangement multiplies the torque output of the planetary transmission prior to delivery to the drive wheel of the vehicle.

Figure 2:
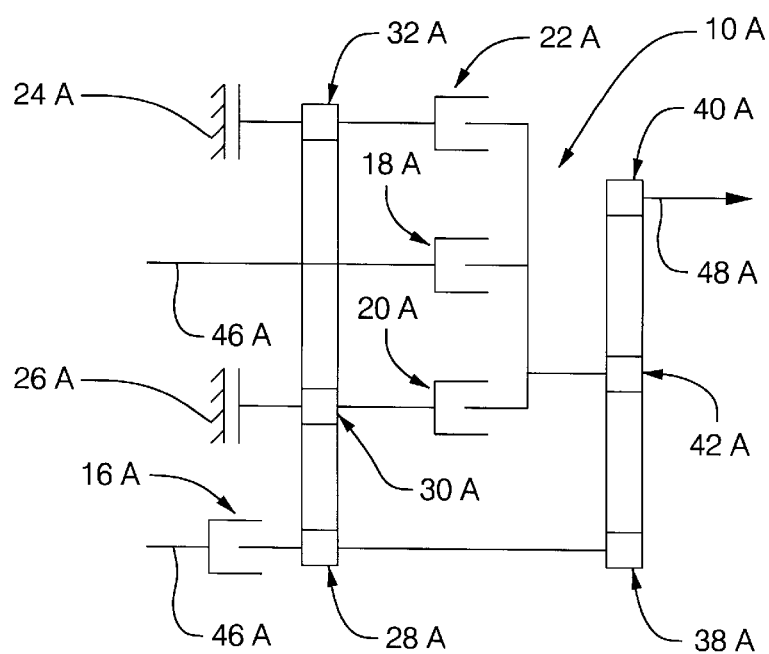
FIG. 2 is a lever diagram of the planetary gearing arrangement shown in FIG. 1.

A lever diagram 10A, shown in FIG. 2, represents the planetary gearing arrangement 10 of FIG. 1, as well as the connections for the clutches 16, 18, 20, 22 and brakes 24, 26. The nodes 28A through 42A of the lever diagram 10A represent the gear members 28 through 42 of FIG. 1 such that the same numerical designation with an A suffix is used to identify the appropriate node. For example, the nodes 28A and 38A represent sun gears 28 and 38 respectively. Other components of FIG. 1 have the same numbering convention for the corresponding components in FIG. 2.

To establish the reverse ratio, the clutches 16 and 20 are engaged as well as the brake 26. The clutches 16 and 20 are preferably engaged in neutral, such that a shift to reverse results in the brake 26 being the "garage shift" device. The sun gear member 38 is driven in forward rotation, the carrier member 42 is held stationary (clutch 20 and brake 26), and the ring gear member rotates in the reverse direction. In the lever diagram, the node 42A is the fulcrum, the node 38A is urged rightward (forward) and the node 40A is urged leftward (reverse).

To establish the first and lowest forward ratio, the clutches 16 and 20 are engaged and the brake 24 is engaged. As described above for reverse, the clutches 16 and 20 can be engaged in neutral, such that the brake 24 is the "garage shift" device. The sun gear members 28, 38 are driven forwardly, the carrier member 32 is held stationary by brake 24 and the ring gear member 30 and carrier member 42 are driven forwardly and the ring gear member 40 rotates forwardly at a reduced gear ratio. In the lever diagram, the node 32A is the fulcrum, the node 28A, 38A is the input (rightward urging) and the node 40A is the output. The node 40A is between the nodes 32A and 28A resulting in reduced rightward urging relative to node 28A.

To engage the second forward gear ratio, the clutch 16 is disengaged and the clutch 18 is engaged while the clutch 20 and brake 24 remain engaged. This is a single transition interchange of the friction devices. The carrier member 42 and ring gear member 30 are driven forwardly by the input shaft 46, the carrier member 32 is stationary (brake 24), the sun gear members 28, 38 rotate forwardly at an increased ratio and the ring gear member 40 rotates forwardly at a reduced ratio. The increased forward rotation of the sun gear member 38 combines with the forward rotation of the carrier member 42 so that the ring gear member 40 rotates faster than in first gear with the same input speed. In the lever diagram, the node 32A remains the fulcrum, the nodes 42A, 30A are interconnected and are the input (rightward urging) and the node 40A is the output (rightward urging). The output node 40A is between nodes 32A and 42A resulting in reduced rightward urging relative to the node 42A. Output node 40A is proportionally closer to input node 42A than in first gear, so that node 40A moves at a higher rate than in first gear. The nodes 28A, 38A will have a rightward urging at a speed greater than the input .

To establish the third forward gear ratio, the clutch 20 is disengaged and the clutch 16 is engaged while clutch 18 remains engaged, resulting in a single transition ratio interchange. This places the simple planetary gear set 14 in a 1:1 or direct gear ratio. The ring gear member 40 rotates forwardly at the same speed as the input shaft 46. The lever diagram is concerned only with nodes 38A, 42A and 40A, all of which are rightwardly urged at input speed. The brake 24 preferably remains engaged during the third gear ratio but has no effect on the output speed since neither of the proportioning clutches 20, 22 are engaged. The ring gear member 30 will rotate forwardly at a reduced ratio relative to the sun gear member 28.

To establish the fourth gear ratio, the clutch 16 is disengaged while the brake 26 is engaged while the clutch 18 and the brake 24 remain engaged. This is also a single transition ratio interchange. With the brakes 24, 26 engaged, the compound planetary gear set is held stationary resulting in the sun gear member 38 also being held stationary. Thus, the sun gear member 38 is the reaction member, the carrier gear member 42 is the input member and the ring gear member 40 is the output member. This is the classical overdrive ratio. In the lever diagram, the node 38A is the fulcrum, the node 42A is the input and the node 40A is the output. Since the input is between the fulcrum and the output, the output is urged in the same direction (rightward) as the input but with a greater value.

To establish the fifth and highest forward ratio, the brake 24 is disengaged and the proportioning clutch 22 is engaged while the clutch 18 and brake 26 remain engaged. This is a single transition ratio interchange. With the brake 26 engaged, the ring gear member 30 is the reaction member in the planetary gear arrangement 10, the carrier gear member 42 is the input member and the ring gear member 40 is the output member. With the proportioning clutch 22 engaged, the carrier gear member 32 is driven forwardly by the input shaft 46 and the sun gear members 28, 38 are driven in the reverse direction by the compound planetary gear set 12. The reverse rotation of the sun gear member 38 adds to the forward rotation of the carrier gear member 42, such that the ring gear member 40 is driven faster than in the fourth gear ratio for any given input speed. In the lever diagram, the fulcrum is node 30A and the nodes 42A and 32A are connected. Since the input nodes 42A, 32A are between the fulcrum node 30A and the output node 40A, the output node 40A is urged further rightward than the input node 42A. The nodes 28A, 38A are urged leftward since they are on the opposite side of the fulcrum node 30A from the input node 42A.

From the foregoing description of the operation of the planetary gear arrangement 10 it will be appreciated by those skilled in the art that the proportioning clutches change the interaction of the gearing. The use of the proportioning clutches in the manner above described permit the reuse of the other friction devices resulting in the five forward gear ratios and the reverse gear ratio with a minimum of gear sets, clutches and brakes.

The following table provides information regarding the characteristics that can be attained with the present invention. The planetary gear arrangement provides good ratio spread from 5.09 to 5.70 with the ring to sun gear ratios chosen. Other numerical values are possible, these have been chosen to indicate the flexibility that can be achieved with the present invention.

| Gear Set 12 R/S | 1.80 | 1.71 | 1.80 |
| --- | --- | --- | --- |
| Gear Set 14 R/S | 2.22 | 1.82 | 2.00 |
| 1st Gear Ratio | 2.81 | 2.82 | 3.00 |
| 2nd Gear Ratio | 1.56 | 1.65 | 1.67 |
| 3rd Gear Ratio | 1.00 | 1.00 | 1.00 |
| 4th Gear Ratio | 0.69 | 0.65 | 0.67 |
| 5th Gear Ratio | 0.55 | 0.51 | 0.53 |
| Reverse Ratio | 2.22 | 1.82 | 2.00 |
| Ratio Spread | 5.09 | 5.49 | 5.70 |
| 1–2 Step Size | 1.80 | 1.71 | 1.80 |
| 2–3 Step Size | 1.56 | 1.65 | 1.67 |
| 3–4 Step Size | 1.45 | 1.55 | 1.50 |
| 4–5 Step Size | 1.25 | 1.25 | 1.27 |

We claim:
1. A planetary gear apparatus comprising:
   an input shaft;
   an output shaft;
   a compound planetary gear set having three members including a sun gear member, a ring gear member and a carrier gear assembly member;
   a simple planetary gear set having three members including a sun gear member, a ring gear member and a carrier gear assembly member;
   four selectively engageable clutch assemblies;

two selectively engageable brake assemblies;

a continuous drive connection between a first member of each planetary gear set;

a first of said clutch assemblies connected with said continuous drive connection and said input shaft;

a second of said clutch assemblies connected with a second member of said simple planetary gear set and said input shaft;

a third of said clutch assemblies connectable between said second member of said simple planetary gear set and a second member of said compound planetary gear set;

a fourth of said clutch assemblies being connectable between said second member of said simple planetary gear set and a third member of said compound planetary gear set;

a first of said brake assemblies connected with said third member of said compound planetary gear set;

a second of said brake assemblies connected with said second member of said compound planetary gear set; and a third member of said simple planetary gear set being continuously connected with said output shaft, one of said clutch assemblies being engaged during four forward ratios exclusive of a lowest forward ratio, one of said brake assemblies being engaged during four forward gear ratios exclusive of a highest gear ratio, another two of said clutch assemblies being engaged during two forward gear ratios including the lowest gear ratio and a reverse gear ratio, another of said brake assemblies being engaged during said reverse ratio and two of said forward gear ratios including the highest ratio.

2. The planetary gear apparatus defined in claim 1 further comprising:

said fourth of said clutch assemblies being engaged only in the highest forward ratio.

3. A planetary transmission comprising:

a compound planetary gear set having a sun gear, a ring gear and a carrier gear assembly with pairs of meshing pinions meshing respectively with said sun gear and said ring gear;

a simple planetary gear set having a sun gear, a ring gear and a carrier gear assembly having a plurality of pinion gears each meshing with both said sun gear and said ring gear; an input shaft;

an output shaft continuously connected for common rotation with said ring gear of said simple planetary gear set;

a first selectively engageable clutch operatively connectable between said input shaft and both said sun gears;

a second selectively engageable clutch operatively connectable between said input shaft and said carrier gear assembly of said simple planetary gear set;

a third selectively engageable clutch operatively interconnecting said ring gear of said compound planetary gear set and said carrier gear assembly of said simple planetary gear set; a fourth selectively engageable clutch operatively interconnecting said carrier gear assemblies of both said planetary gear sets; a first selectively engageable brake for selectively restraining rotation of said carrier gear assembly of said compound planetary gear set; and a second selectively engageable brake for selectively restraining rotation of said ring gear of said compound planetary gear set, said first and third clutches being engaged during a reverse gear ratio and a first and lowest forward gear ratio and also being engageable during a neutral condition, said second clutch and said first brake being engaged during a second, third, and fourth intermediate gear ratios, said second and fourth clutches and said second brake being engaged to establish a fifth and highest forward gear ratio, said second brake being engaged during said reverse gear ratio and said fourth forward gear ratio, said first brake being engaged during said first forward gear ratio, said third clutch being engaged during said second forward gear ratio, and said first clutch being engaged during said third forward gear ratio.

* * * * *